(12) United States Patent
Chen et al.

(10) Patent No.: US 12,719,512 B2
(45) Date of Patent: Aug. 25, 2026

(54) RECEIVER ARCHITECTURE FOR NEW RADIO SYSTEMS

(71) Applicant: MEDIATEK Singapore Pte. Ltd., Singapore (SG)

(72) Inventors: Yangjian Chen, Cambourne (GB); Jonathan Richard Strange, Cambourne (GB); Yabo Li, San Jose, CA (US); Ganning Yang, San Jose, CA (US); Wei-Yu Lai, Hsin-Chu (TW); Wei-Jen Chen, Hsin-Chu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 329 days.

(21) Appl. No.: 18/513,365

(22) Filed: Nov. 17, 2023

(65) Prior Publication Data

US 2024/0088923 A1 Mar. 14, 2024

Related U.S. Application Data

(62) Division of application No. 17/135,635, filed on Dec. 28, 2020, now Pat. No. 11,863,216.

(Continued)

(51) Int. Cl.

*H04B 1/04* (2006.01)
*H01Q 3/24* (2006.01)

(Continued)

(52) U.S. Cl.

CPC ............... *H04B 1/04* (2013.01); *H01Q 3/247* (2013.01); *H01Q 3/2617* (2013.01); *H04B 1/30* (2013.01);

(Continued)

(58) Field of Classification Search

CPC .......... H04B 1/06; H04B 1/10; H04B 1/1036; H04B 1/16; H04B 1/18; H04B 1/30;

(Continued)

(56) References Cited

U.S. PATENT DOCUMENTS 10,728,783 B2 * 7/2020 Hoover ................. H04W 76/28
11,044,650 B2 * 6/2021 Chen .................. H04W 72/046

(Continued)

FOREIGN PATENT DOCUMENTS

CN 108702188 A 10/2018
CN 109690961 A 4/2019

(Continued)

OTHER PUBLICATIONS

Extended European Search Report issued May 21, 2021 in connection with European Application No. 21150927.8.

*Primary Examiner* — Quochien B Vuong
(74) *Attorney, Agent, or Firm* — McClure, Qualey & Rodack, LLP

(57) ABSTRACT

Wireless receiver systems and methods for user equipment are described that employ multiple receiver heads. The multiple heads can receive wireless communication signals over different receive paths from different transmission sources. The systems can scan and monitor signal quality from all receiver heads during a scheduled gap in a communication link without interfering with an ongoing communication session.

10 Claims, 3 Drawing Sheets

Related U.S. Application Data

(60) Provisional application No. 62/961,310, filed on Jan. 15, 2020.

(51) Int. Cl.

| | |
|---|---|
| ***H01Q 3/26*** | (2006.01) |
| ***H04B 1/30*** | (2006.01) |
| ***H04B 17/30*** | (2015.01) |
| ***H04B 17/309*** | (2015.01) |

(52) U.S. Cl.
CPC ... *H04B 17/309* (2015.01); *H04B 2001/0408* (2013.01); *H04B 2001/307* (2013.01)

(58) Field of Classification Search
CPC ...... H04B 17/20; H04B 17/29; H04B 17/373; H01Q 3/24; H01Q 3/247; H01Q 3/26; H01Q 3/2617
See application file for complete search history.

(56) References Cited

U.S. PATENT DOCUMENTS

| | | | |
|---|---|---|---|
| 11,646,781 | B2 * | 5/2023 | Cui ..................... H04B 17/309 375/224 |
| 2003/0002471 | A1 | 1/2003 | Crawford et al. |
| 2007/0232309 | A1 | 10/2007 | Koszarsky |
| 2014/0227982 | A1 | 8/2014 | Granger-Jones et al. |
| 2018/0019768 | A1 | 1/2018 | King et al. |
| 2018/0255472 | A1 | 9/2018 | Chendamarai Kannan et al. |
| 2018/0278320 | A1 | 9/2018 | Chendamarai Kannan et al. |
| 2018/0375221 | A1 * | 12/2018 | Petersson ................ H01Q 3/24 |
| 2020/0366323 | A1 | 11/2020 | Tsuda et al. |
| 2021/0067209 | A1 | 3/2021 | Gopal et al. |
| 2021/0218426 | A1 | 7/2021 | Chen et al. |

FOREIGN PATENT DOCUMENTS

| | | | |
|---|---|---|---|
| CN | 109863727 | A | 6/2019 |
| CN | 109905153 | A | 6/2019 |
| TW | 201308927 | A | 2/2013 |
| WO | WO 2018/232294 | A1 | 12/2018 |

* cited by examiner

RECEIVER ARCHITECTURE FOR NEW RADIO SYSTEMS

CROSS-REFERENCE TO RELATED APPLICATIONS

This application is a Division of U.S. application Ser. No. 17/135,635, filed Dec. 28, 2020, and entitled "RECEIVER ARCHITECTURE FOR NEW RADIO SYSTEMS", which claims priority to U.S. Provisional Patent Application Ser. No. 62/961,310, filed Jan. 15, 2020, and entitled "RECEIVER ARCHITECTURE FOR NEW RADIO SYSTEMS," the entirety of each of which is incorporated by reference herein.

BACKGROUND

Technical Field

The techniques described herein relate to receiver systems for wireless communications.

Discussion of the Related Art

Wireless receiver systems have become more sophisticated to provide improved signal reception for wireless devices such as cell phones that may move over large distances during a communication session, such as a phone call. When moving, signal quality at the user's equipment (UE) may change with time. Because of changing signal quality, the UE may intermittently search for signals on other signal paths from other sources (e.g., other wireless towers) that have improved signal quality, and change to a different signal path when a signal with superior signal quality is detected. Such receiver systems may include more than one receiving antenna.

SUMMARY

A receiver system for current New Radio (NR) systems can include multiple receiver heads. A receiver head may comprise one or more antenna sub-arrays. When a receiver is operating in millimeter wave (mmW) bands (such as the FR2 band), each receiver head may be directional, e.g., configured to have best reception and transmission for a signal coming from or transmitted to a certain direction. Each receiver head may also be adapted to receive one or more types of signal polarization (e.g., vertical and/or horizontal). According to the present embodiments, signal quality may be monitored regularly during scheduled gaps in communication sessions for a majority of or all receiver heads in user equipment, for example, without disrupting or interfering with an ongoing communication session. Such monitoring is possible using a plurality of amplifiers and mixers that can be selectively activated in receive paths to simultaneously monitor signals from two or more antenna sub-arrays. The selective activation may be accomplished in part with a switching network. The switching network can have M switches that can be quickly reconfigured to connect any one of N inputs from the antenna sub-arrays to K outputs and mixers in receiver paths. Monitoring of signals from all receiver heads during a scheduled gap can allow a receiver system to select one or more signal paths with best signal quality during each scheduled gap in a communication session and maintain high-quality communication links during a communication session.

Some embodiments relate to circuits for wireless signal reception. Such circuits can include a switching network having: M switches; N inputs connected to the M switches and configured to connect to N antenna sub-arrays; and K outputs connected to the M switches and configured to connect to K amplifiers, where M is greater than N and K and M, N, and K are integers greater than 1 and wherein the M switches are configured to route a signal from a selected input of the N inputs to a selected output of the K outputs.

Some embodiments relate to a method of monitoring wireless signals comprising: during a scheduled gap in a wireless communication link, simultaneously evaluating a quality of two signals from a first antenna sub-array that receives signals having at least two different polarizations and from a second antenna sub-array that receives signals having at least two different polarizations with a receiver system having four receive paths; and evaluating the quality of additional signals during the scheduled gap from additional antenna sub-arrays in the receiver system.

Some embodiments relate to a controller for a receiver system configured to: simultaneously evaluate, during a scheduled gap in a wireless communication link, a quality of two signals from a first antenna sub-array that receives signals having at least two different polarizations and from a second antenna sub-array that receives signals having at least two different polarizations with a receiver system having four receive paths; and evaluate the quality of additional signals during the scheduled gap from additional antenna sub-arrays in the receiver system.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1:
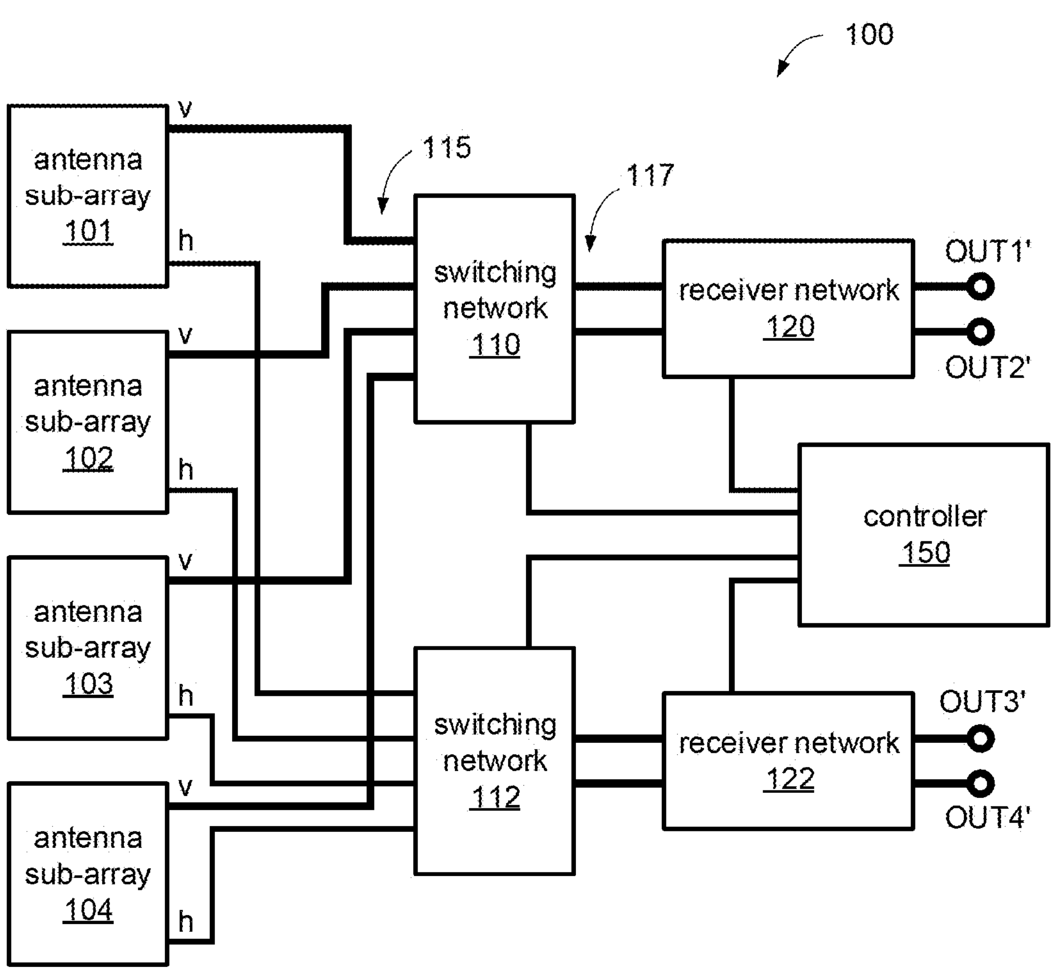
FIG. 1 is a block-diagram depiction of a wireless receiver system for wireless communications, according to some embodiments.

The present embodiments relate to improved receiver architectures for wireless communication systems. Wireless communication systems can provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of base stations, each simultaneously supporting communication for multiple communication devices, such as user equipment (e.g., cell phone, lap-tops, networked consumer electronics, etc.). In a Long-Term Evolution (LTE) or LTE-Advanced (LTE-A) network, a set of one or more base stations may define an eNodeB (eNB). In a next generation, New Radio (NR), millimeter wave (mmW), or 5G network, a base station may take the form of a smart radio head (or radio head (RH)) or access node controller (ANC), with a set of smart radio heads in communication with an ANC defining a gNodeB (gNB). A base station may communicate with a set of UE on downlink channels (e.g., for transmissions from a base station to one or more UE devices) and uplink channels (e.g., for transmissions from one or more UE devices to a base station).

Wireless communication systems such as those described above can use carrier waves having millimeter wave (mmW) frequency ranges (e.g., between 10 GHz and 100 GHz or between 20 GHz and 80 GHz). Such frequencies may incur increased signal attenuation (also referred to as path loss) which can be due to environmental condition in some cases. For example, path loss may be affected by temperature, barometric pressure, signal diffraction from objects, etc, which can vary over time and can change based on the UE's location.

New radio systems have increased in complexity to transmit and receive communication signals over multiple signal paths. To do so, a user's equipment can include multiple receiver heads that are used to receive and/or transmit signals over different signal paths. Each receiver head may have one or more antennas, which may be referred to as an "antenna sub-array".

In wireless communication systems of the present embodiments, a transmitter system can encode information onto one or more radio frequency (RF) carrier waves and then wirelessly transmit the RF signals using one or more antennas. A receiver system can detect the RF signals using one or more receiver heads and processes the received signals to recover the encoded information. In some cases, transmission and/or reception can be done simultaneously over two or more signal paths.

For high data rate wireless communication, a transmitter may be adapted to simultaneously transmit portions of the RF signals in different frequency ranges to increase data transfer rates over the communication link. For example, Long Term Evolution (LTE) and Long Term Evolution Advanced (LTE-A) systems employ a carrier aggregation scheme where multiple RF signals are transmitted simultaneously in different frequency ranges (called component carrier signals). Each of these component carrier signals may support a data transfer rate of up to 150 megabits per second (Mbps). Accordingly, the data transfer rate of a communication link using multiple component carrier signals will increase as additional component carrier signals are added to the link (e.g., two component carrier signals at 150 Mbps can provide a total data transfer rate for the link of up to 300 Mbps).

The term "communication link" may be used herein to generally describe one or more communication sub-links between a UE and a remote device. For example, a communication link may comprise two or more sub-links between the UE and remote device that occur using different carrier waves and/or different signal paths.

Because of variable path loss, a UE should regularly scan different signal paths for improved signal quality on alternative signal paths. Signal quality may be determined based on one or more factors, such as signal strength, signal-to-noise ratio, error rate, etc. To avoid disrupting an ongoing communication session, the scanning of signal paths and monitoring for improved signal quality should occur during scheduled gaps in the communications (sometimes referred to a "transmission gaps" or "measurement gaps.") Because there can be a substantial number of signal paths to scan due to multiple receiver heads, frequency bands, and polarizations, the inventors have recognized and appreciated that it can be very difficult or not possible to scan all signal paths and detect signal quality on each path with conventional receiver architectures during each scheduled gap in a communication session. Accordingly, the inventors have conceived of receiver architectures and methods that can provide scanning and monitoring signal quality for multiple receiver heads simultaneously during a scheduled gap in communications and quickly switch between a majority of or all signal paths during the gap. Examples of such receiver systems and methods are described below in connection with FIG. 1 through FIG. 4, though the invention is not limited to only the systems and methods as illustrated.

Referring now to FIG. 1, an example of a receiver architecture in accordance with the present teachings is depicted with a block diagram. Some or all of the components shown in FIG. 1 may be implemented as integrated circuit (IC) components on one or more semiconductor IC chips. A receiver system 100 may comprise a plurality of antenna sub-arrays 101, 102, 103, 104 that have outputs from antennas connected to two or more switching networks 110, 112. Outputs from each switching network can connect to a corresponding receiver network 120, 122 that processes selected signals received from the antenna sub-arrays. Each switching network is configured to connect an output from a selected antenna sub-array to a selected input of a receiver network. A receiver system 100 can also include (either on chip or off chip) a controller 150 that is in communication with the switching networks and/or receiver networks. The controller can provide control signals to the switching networks 110, 120 and receiver networks 120, 122 during operation of the receiver system 100. For example, the controller 150 may provide signals to control components of these networks when routing signals from the antenna sub-arrays to receiver paths OUT1', OUT2', OUT3', OUT4' for signal processing.

The antenna sub-arrays 101, 102, 103, 104 may be implemented as integrated circuit components on a chip and/or printed circuit board. For example, each sub-array may comprise one or more antennas that are each implemented as a conductive loop antenna, a conductive horn antenna, a conductive dipole antenna, or one or more conductive shapes formed on a chip or printed circuit board. According to some embodiments, an antenna sub-array may comprise two or more antennas that are each shaped and/or oriented to preferentially receive a particular polarization of an RF signal (e.g., horizontal, vertical, circular, etc.).

Figure 2:
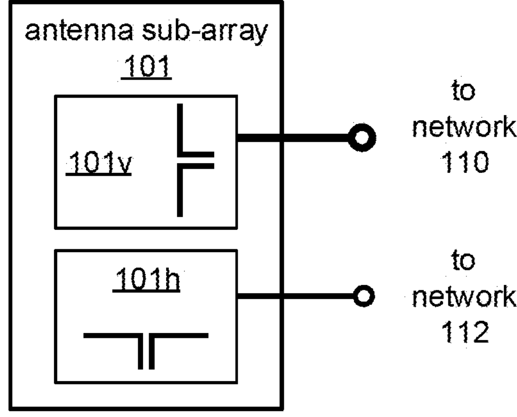
FIG. 2 depicts an example of an antenna sub-array, according to some embodiments.

FIG. 2 depicts an example of an antenna sub-array 101 that includes a first dipole antenna 101*v* oriented to preferentially receive vertically polarized RF signals and a second dipole antenna 101*h* oriented to preferentially receive horizontally polarized RF signals. However, the antenna sub-arrays are not limited to the illustrated and described embodiments. Other antenna designs and orientations may be used additionally or alternatively to preferentially receive other types of polarizations.

A switching network 110, 112 may have N input ports 115 (four shown in the example of FIG. 1) and K output ports 117 (two shown in the illustrated example) where N and K are positive integers greater than 1. A switching network 110, 112 can be implemented with a plurality of transistors, according to some embodiments. For example, control signals can be applied to a gate or base of one or more transistors to connect and disconnect a selected input port 115 of the switching network to a selected output port 117 of the switching network via the current-carrying terminals (e.g., source and drain or emitter and base) of the one or more transistors. There may be M switches in a switching network 110, 112, and each of the M switches may be configured to receive a control signal from a controller 150 to configure and reconfigure connections between input ports 115 and output ports 117 of the switching network for routing signals from the input ports to the output ports and receive paths. In some cases, a switching network may include additional circuit components such as diodes, resistors, capacitors, logic circuits, amplifiers, and buffers.

According to some implementations, high-speed transistors may be used in a switching network 110, 112. In some cases, the transistors may be high-electron-mobility transistors (HEMTs). The transistors may enable each switch to transition from a fully off state to a fully on state in no more than 15 nanoseconds, according to some embodiments. In some implementations, the transistors may enable each switch to transition from a fully off state to a fully on state in no more than 5 nanoseconds. The transistors may exhibit essentially equal switching speeds for transitions from fully off to fully on states and from fully on to fully off states. With high-speed transistors, a switching network 110, 112 may reconfigure its internal connections between one or more input ports and one or more output ports within a time span that is between 5 nanoseconds and 20 nanoseconds, though shorter or longer reconfiguration times are possible in some implementations. According to some embodiments, each switch may be implemented as those described in connection with FIG. 4A and FIG. 4B in U.S. Pat. No. 10,516,432 issued Dec. 24, 2019 and titled "Communication System with Switchable Devices," which patent is incorporated by reference herein in its entirety.

Figure 3:
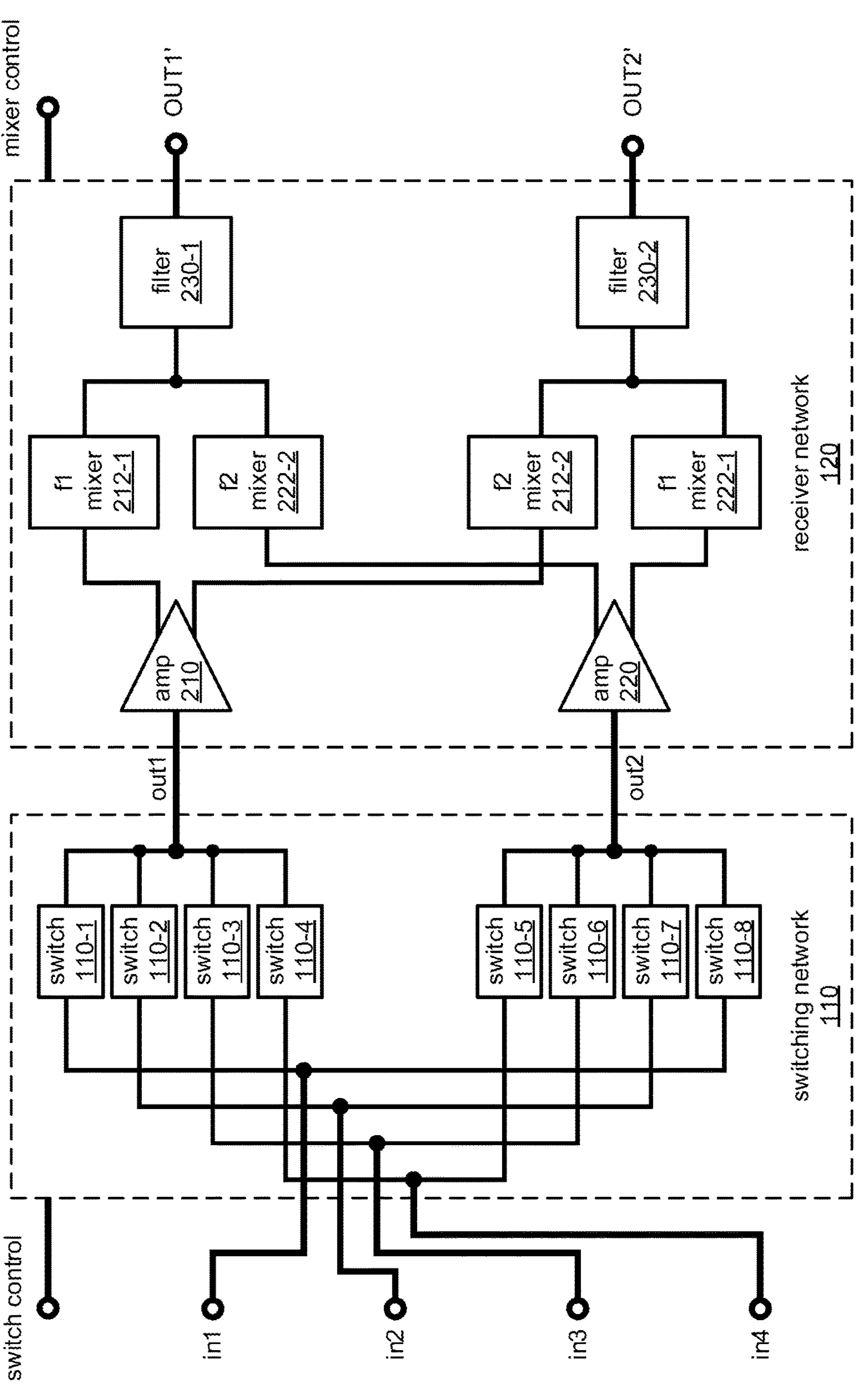
FIG. 3 depicts further details of an example of a switching network and of an example of a receiver network, according to some embodiments.

Further details of an example of a switching network 110, 112 are depicted in the block circuit diagram of FIG. 3. In some embodiments, a switching network may provide only one through-connection at a time. For example, only one signal on an input port (in1, in2, in3, in4) may connect through to one output port (out1, out2) during a span of time. According to other implementations, a switching network 110, 112 may provide multiple through-connections simultaneously. For example, switch 110-1 may be in an "on" or connected state to connect a signal on input port in1 to output port out1, while switches 110-2, 110-3, 110-4, 110-5, 110-6 and 110-8 are in an "off" or disconnected state. The signal from output port out1 may be processed by a mixer and filter on a path to an output port of the receiver network 120 (OUT1' or OUT2', depending on which mixer 212-1 or 212-2 is activated). At the same time that switch 110-1 is in an "on" or connected state, switch 110-7 can be in an "on" or connected state to connect a signal on input port in2 to output port out2. The signal from output port out2 may be processed by a mixer and filter on a path to an output port of the receiver network 120 (OUT1' or OUT2', depending on which mixer 222-1 or 222-2 is activated). In such cases, all receiver heads and/or receive paths may be active at a same time, e.g., to enable fast head and receive path selection during an initial cell search, neighboring cell measurement, and link failure recovery. In some embodiments, time-division multiplexing (TDM) may be used to alternatingly connect and disconnect, in an interleaved manner, two or more input ports to the two outputs out1, out2 during a communication session. In such cases, only one through-connection may be active at a time, and different through-connections are rapidly cycled through by the receiver system 100.

In embodiments of the present invention, any input port of a switching network may connect to any output port of the same switching network. An example of such reconfigurability is evident from the illustration of FIG. 3. For example, any input port (in1, in2, in3, in4) of the switching network 110 can be connected to any output port (out1, out2) of the switching network 110. Such reconfigurability is beneficial for rapidly scanning different signal paths and detecting quality of signals from different antenna sub-arrays during scheduled gaps in a communication link.

An additional benefit of the switching networks of the present invention is that they are readily scalable from three to four or more inputs (in1, in2, in3, . . . ), and additional output ports can be added for additional receive signal paths. For the illustrated example in FIG. 3, an additional input port can be added by adding two more switches in parallel to the existing switches, one for each bank of switches connected to an output port. Additional output ports can be added by adding an additional bank of switches in parallel with the two banks of switches and that connect to the input ports in a same manner as the existing banks of switches. According to some embodiments, a switching network 110, 112 can have M switches, N inputs connected to the M switches and configured to connect to N antenna sub-arrays, and K outputs connected to the M switches. M may be greater than N and K, and M, N, and K are integers greater than 1. In some cases, the value of M may equal N×K. The N inputs can receive RF signals from the antenna sub-arrays, and the K outputs can provide the RF signals for processing on a receive path.

According to some implementations, all components of a switching network 110 can be fabricated on a single integrated-circuit chip. In some cases, the amplifiers 210, 220 of the receiver network 120 may also be fabricated on the same chip as the switches. In yet other cases, the amplifiers 210, 220 and mixers or synthesizers 212-1, 212-2, 222-1, 222-2 of the receiver network 120 may also be fabricated on the same chip as the switches. In yet further implementations, the amplifiers 210, 220, mixers or synthesizers 212-1, 212-2, 222-1, 222-2, and filters 230-1, 2301-2 of the receiver network 120 may also be fabricated on the same chip as the switches.

Although two switching networks 110, 112 are depicted in the illustration of FIG. 1, a receiver system 100 may have more than two switching networks. For example, more than two switching networks may be used if additional types of polarization are used (e.g., right circular and/or left circular in addition to vertical and horizontal). As another example, more than two switching networks may be used if additional antenna sub-arrays are used. For example, if four additional antenna sub-arrays are used, the receiving system of FIG. 1 may be duplicated and the two receiving systems operated in parallel.

Outputs from the switching networks 110, 112 may connect to receiver networks 120, 122 as shown in FIG. 1. Details of an example receiver network 120 are depicted in FIG. 3. According to some implementations, a receiver network may comprise one or more amplifiers 210, 220 each connected to an output from the switching network 110. The amplifiers 210, 220 may each have outputs that connect to two or more mixers or synthesizers 212-1, 222-2, 212-2, 222-1. Outputs from the mixers or synthesizers may be provided to filters 230-1, 230-2 in the receiver network 120, according to some embodiments.

The amplifiers 210, 220 may be RF amplifiers and configured to receive signals from the K outputs of a switching network 110. An amplifier can have two outputs that provide a same signal on each output. In some cases, the signals on the outputs may be phase shifted with respect to each other (e.g., by 90 degrees) but otherwise have essentially the same modulations and encoded data. In another embodiment, an amplifier may have a single output that is provided to a signal splitter, which splits the signal into two copies, or phase-shifted copies, on two output ports.

Outputs from the amplifiers (or signal splitters) can be provided to two or mixers or synthesizers. For example, a first output from a first amplifier 210 can be provided to a first mixer 212-1, and a second output from the first amplifier 210 can be provided to a second mixer 212-2. The first mixer 212-1 may connect to a first output OUT1' receive path of the receiver network 120 and the second mixer 212-2 may connect to a separate second output OUT2' receive path.

The first mixer 212-1 may mix the first signal with an RF signal from a local oscillator operating at a first frequency. If data is encoded on a carrier wave of the same first frequency, the first mixer 212-1 can beat the signal down to an intermediate frequency that can be operated on by the filter 230-1 and from which the data can be decoded downstream in the first receive path that connects to a first output port OUT1'.

The second mixer 212-2 may mix the first signal with an RF signal from a local oscillator operating at a second frequency. If data is encoded on a carrier wave of the same second frequency, the second mixer 212-2 can beat the signal down to an intermediate frequency that can be operated on by the filter 230-2 and from which the data can be decoded downstream in the second receive path that connects to a second output port OUT2'. The filters 230-1, 230-2 may comprise noise filters and may be implemented with digital circuitry, analog circuitry, or some combination thereof.

According to some embodiments, a first receiver network 120 may receive signals of only a same type of first polarization (e.g., vertical according to the illustration of FIG. 1). A second receiver network 122 may receive signals of only a same type of second polarization (e.g., horizontal) that is different from the first polarization. In some implementations, the type of polarization received by a first switching network and first receiver network may be orthogonal to a type of polarization received by a second switching network and second receiver network. In some embodiments, the mixers or synthesizers in a receiver network 120, 122 may each be individually activated and deactivated by control signals received from a controller 150. For example, the local oscillators may be turned on and off by control signals from the controller 150 and applied to the mixers. Alternatively or additionally, a switch in the receive path may be placed in a connected or disconnected state to switch a mixer in or out of a receive path.

In some implementations, a mixer or synthesizer in a receiver network 120 may be activated immediately prior to a scheduled gap in a communication link. Alternatively or additionally, a mixer or synthesizer may be activated immediately prior to reconfiguring switches in a switching network 110 to apply a signal from an input port to the activated mixer. In some cases, the time that a mixer is activated before being switched into a receive path by the switching network or before a scheduled gap is between 5 microseconds and 50 microseconds.

As may be appreciated from the receiver system architecture of FIG. 1 and FIG. 3, both polarized signals from two receiver heads may be monitored simultaneously. For example, vertically-polarized signals from two antenna sub-arrays 101, 104 can be provided to two separate output receive paths OUT1', OUT2' from a first receiver network 120 by putting only switches 110-1 and 110-5 in a connected state and placing all other switches in a disconnected state. Additionally, to monitor for signal quality on a first carrier-wave frequency, mixers 212-1 and 222-1 can be activated and the other two mixers deactivated. Simultaneously, the horizontally-polarized signals for the same two antenna sub-arrays 101, 104 can be provided to two separate output receive paths OUT3', OUT4' from a second receiver network 122 in a similar manner. To switch from monitoring signal quality of the first carrier-waver frequency to a second carrier-wave frequency, the activated mixers can be deactivated and the other mixers 212-2, 222-2 can be activated.

In some cases, signals output from more than two antenna sub-arrays can be monitored simultaneously. For the illustrated example in FIG. 3, vertically polarized signals from two different antenna sub-arrays (e.g., 102, 103) can be provided to two receive paths OUT1', OUT2', while horizontally polarized signals from two other different antenna sub-arrays (e.g., 101, 104) can be provided to two other receive paths OUT3', OUT4'. Monitoring outputs from more than two antenna sub-arrays is possible by simply reconfiguring the switches in the switching networks 110, 112.

In some implementations, each receive path connecting to an output port OUT1', OUT2', OUT3', OUT4' of a receiver network 120, 122 can connect to any antenna sub-array for a particular polarization and particular carrier frequency. For example, any antenna sub-array 101, 102, 103, 104 can provide vertical polarization received from an antenna 101$v$ to either receive paths OUT1', OUT2' of a first receiver network. The provided vertical polarization can be mixed with local oscillator outputs at either of two carrier frequencies by mixers or synthesizers 212-1, 212-2, 222-1, 222-2, according to the example architecture depicted in FIG. 1 and FIG. 3.

Further, signal quality on two carrier frequencies for a same antenna sub-array can be monitored simultaneously on two separate receive paths. For example, a vertical polarization signal received from an antenna sub-array 102 can be provided to a first amplifier 210 by placing switch 110-2 in a connected state. A first output from the amplifier 210 can be provided to a first mixer 212-1 for mixing with an output from a local oscillator at a first frequency f1, and then provided to filter 230-1 on a receive path connected to a first output port OUT1'. A second output from the amplifier 210 can be provided to a second mixer 212-2 for mixing with an output from a local oscillator at a second frequency f2, and then provided to filter 230-2 on receive path connected to a second output port OUT2'.

By including a second amplifier 220 and second bank of switches in a switching network, each receive path can unrestrainedly connect to each antenna sub-array. Accordingly, the receiver architecture of the present embodiments can monitor signal strengths for two antenna sub-arrays simultaneously. The receiver architecture of the present embodiments can also support non-contiguous carrier aggregation (NCCA) and multiple-input, multiple-output communication (MIMO) links.

Figure 4:
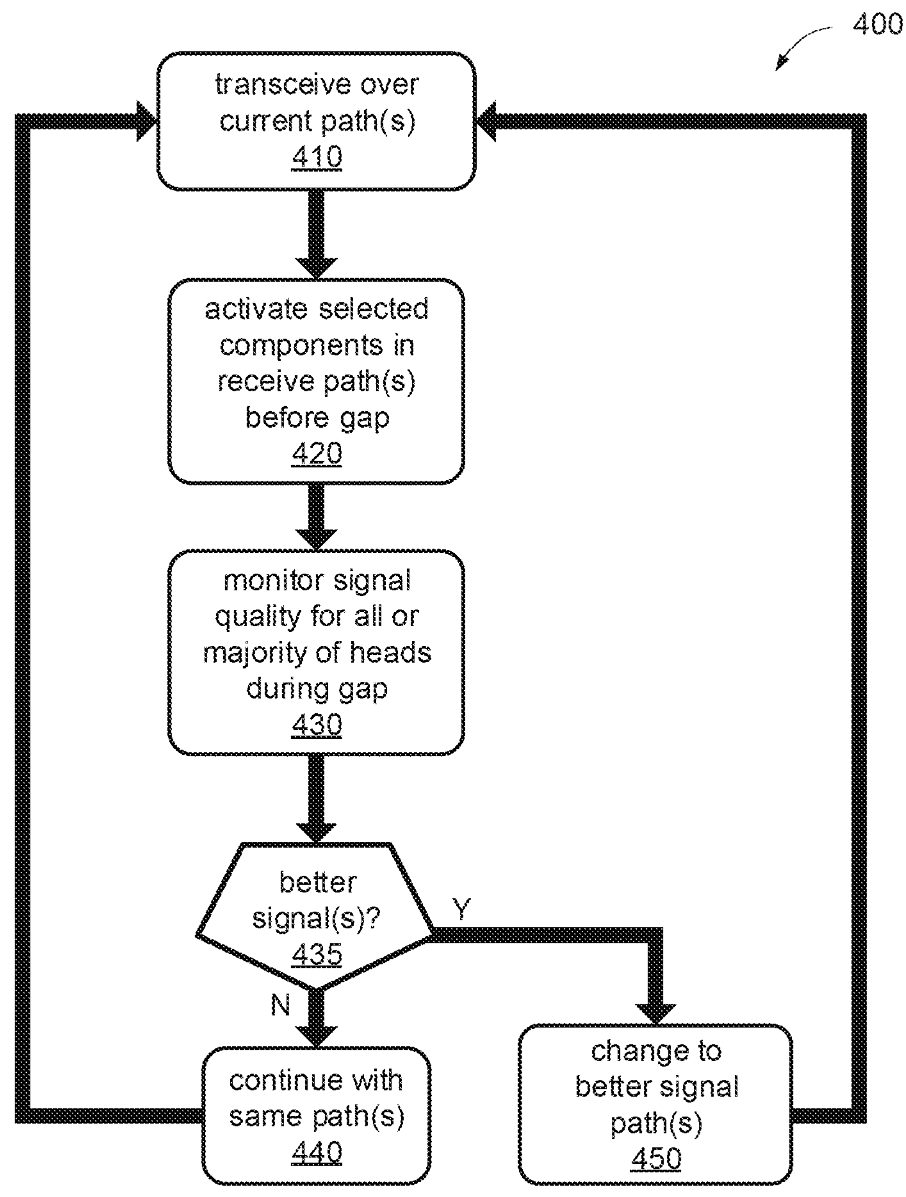
FIG. 4 depicts an example of acts associated with a method of wireless reception of communication signals, according to some embodiments.

FIG. 4 depicts an example of acts associated with a method 400 of wireless reception of communication signals that can be implemented with receiver architectures of the present embodiments. According to some embodiments, a user equipment (UE) having a receiver architecture in accordance with the present embodiments can transmit and/or receive (act 410) one or more signals over one or more signal paths during a communication session between the UE and a remote device. For example, time-division duplexing (TDD) may be used to separate transmitted and received signals. During such a communication link, there can be a plurality of scheduled gaps in the communication link, during which the UE may scan several signal paths and monitor signal quality on those paths. In some implementations, prior to a scheduled gap, the receiver system may activate (act 420) one or more selected components in one or more receive paths before the gap begins, while the communication link is still active. For example, the receiver system may activate a mixer and/or amplifier in a receive path immediately before a start time of the gap. The activated mixer and/or amplifier may not be in an active receive path during the ongoing communication link before the gap. By activating the mixer and/or amplifier, they can be placed in a ready state for when the scheduled gap begins. The activation of the one or more selected components may occur between 5 microseconds and 50 microseconds before a start of the scheduled gap.

A method 400 may further comprise monitoring (act 430) signal quality for at least a majority of the receiver heads of the receiving system during a scheduled gap in the communication link. In some embodiments, signal quality for all of the receiver heads of the receiving system can be monitored (act 430) during the scheduled gap. For example, the signals from the different antenna sub-arrays 101, 102, 103, 104 can be scanned by sequentially activating switches and mixers as described above in connection with FIG. 1 and FIG. 3 and signal quality can be monitored on each signal path. The monitoring of signal quality may comprise one or more acts of: evaluating signal strength (e.g., signal amplitude), evaluating signal-to-noise ratio, and evaluating signal error rate.

If it is determined (act 435) that there are no other signal paths with improved signal quality, then the receiver system may continue transceiving (act 440) using the same signal path(s). Alternatively, if it is determined (act 435) that there is one or more other signal paths with improved signal quality, then the receiver system may change reception (act 450) to one or more receiver heads on the other signal path(s) having improved signal quality. The acts of a method 400 may repeat in a cyclical manner, as indicated in FIG. 4, throughout a communication session.

When changing reception (act 450) to one or more receiver heads on one or more other signal paths, the wireless receiver system may activate a switching network to disconnect from at least one antenna sub-array that is currently active and used for a communication session immediately before the scheduled gap. The system may further activate the switching network to connect to at least one other antenna sub-array that was not active immediately before the scheduled gap. In some cases, the receiver system may turn on one or more of the mixers in the receiver network that will be connected in one or more receive paths for the at least one other antenna sub-array immediately before activating the switching network to connect to the at least one other antenna sub-array. In some embodiments, the turning on is between 5 microseconds and 50 microseconds before activating the switching network to connect to the at least one other antenna sub-arrays.

The method 400 of wireless communication described above in connection with FIG. 4 includes various functionalities that can be implemented, at least in part, with logic circuitry, analog circuitry, and/or one or more processor(s) and code. For example, acts of activating selected components, scanning signal paths, monitoring signal quality, determining whether better signal quality exists on some signal paths, and changing reception to one or more better signal paths can be implemented, at least in part, with logic circuitry and/or one or more processor(s) and code. Code written to perform such functionalities, or part of such functionalities, can be stored on non-transitory computer-readable media, so that it can be loaded onto one or more processors (or used to configure circuitry) to adapt the one or more processors (or circuits) to perform the functionalities or parts thereof. Such circuitry may or may not include at least one field-programmable gate array (FPGA), application specific integrated circuit (ASIC), and/or digital signal processor (DSP). A processor may be a microprocessor or microcontroller, in some embodiments. Such circuitry and/or one or more processors may be part of controller 150, referring again to FIG. 1.

In some cases, the controller 150 may be implemented using hardware or some combination of hardware, firmware, and code (software). When implemented in part using code, suitable code can be executed on a suitable processor (e.g., a microprocessor) or collection of processors. The one or more processors can be implemented in numerous ways, such as with dedicated hardware, or with general purpose hardware (e.g., one or more microprocessors) that can be programmed using code to perform the functions described above.

In this respect, it should be appreciated that one implementation of at least a portion of the embodiments described herein may comprise at least one computer-readable storage medium (e.g., RAM, ROM, EEPROM, flash memory or other memory technology, or other tangible, non-transitory computer-readable storage medium) encoded with computer code (i.e., a plurality of executable instructions) that, when executed on one or more processors, performs at least some of the above-discussed functionalities of one or more embodiments. In addition, it should be appreciated that the reference to code which, when executed, performs any of the above-discussed functionalities, is not limited to an application program running on a host computer. Rather, the terms code and software are used herein in a generic sense to reference any type of computer code (e.g., application software, firmware, microcode, machine language, or any other form of computer instruction) that can be employed to program one or more processors and/or logic circuitry to implement functionalities described herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined with aspects described in other embodiments.

Use of ordinal terms such as “first,” “second,” “third,” etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof is meant to encompass the items listed thereafter and equivalents thereof as well as additional items.

What is claimed is:

1. A method of monitoring wireless signals comprising:

during a scheduled gap in a wireless communication link, simultaneously evaluating a quality of two signals from a first antenna sub-array that receives signals having at least two different polarizations and from a second antenna sub-array that receives signals having at least two different polarizations with a receiver system having four receive paths;

evaluating quality of additional signals during the scheduled gap from additional antenna sub-arrays in the receiver system;

wherein the receiver system comprises:

a first mixer or synthesizer connected to a first output of a first amplifier;

a second mixer or synthesizer connected to a second output of the first amplifier;

a third mixer or synthesizer connected to a third output of a second amplifier;

a fourth mixer or synthesizer connected to a fourth output of the second amplifier; and turning on one or more of the first through fourth mixers between 5 microseconds and 50 microseconds before a start of the scheduled gap;

wherein the one or more mixers were not in use for signal reception immediately prior to being turned on.

2. The method of claim 1, wherein the method is performed at least partially by a receiver and a total number of antenna sub-arrays connected to the receiver is at least three and all signals from all antenna sub-arrays are evaluated during the scheduled gap.

3. The method of claim 1, wherein the quality comprises signal strength.

4. The method of claim 1, wherein the receiver system further comprises:

a switching network;

a first output of the switching network coupled to a first input of the first amplifier;

a second output of the switching network coupled to a second input of the second amplifier; and N inputs to the switching network to receive signals from N different antenna sub-arrays, where N is an integer greater than 1;

wherein an output of the first mixer or synthesizer and an output of the third mixer or synthesizer are connected to a first node and an output of the second mixer or synthesizer and an output of the fourth mixer or synthesizer are connected to a second node.

5. The method of claim 4, wherein evaluating the quality of additional signals comprises:

activating the switching network to disconnect from at least one of the first and second antenna sub-arrays;

activating the switching network to connect to at least one of the additional antenna sub-arrays; and turning on one or more of the first through fourth mixers that will be connected in one or more receive paths for the at least one additional antenna sub-arrays immediately before activating the switching network to connect to at least one of the additional antenna sub-arrays.

6. The method of claim 5, wherein the turning on is between 5 microseconds and 50 microseconds before activating the switching network to connect to at least one of the additional antenna sub-arrays.

7. A controller for a receiver system configured to:

simultaneously evaluate, during a scheduled gap in a wireless communication link, a quality of two signals from a first antenna sub-array that receives signals having at least two different polarizations and from a second antenna sub-array that receives signals having at least two different polarizations with a receiver system having four receive paths; and evaluate quality of additional signals during the scheduled gap from additional antenna sub-arrays in the receiver system;

wherein the controller is further configured to turn on one or more mixers in at least one receiver network of the receiver system between 5 microseconds and 50 microseconds before a start of the scheduled gap, wherein the one or more mixers were not in use for signal reception immediately prior to being turned on.

8. The controller of claim 7, wherein the method is performed at least partially by a receiver, a total number of antenna sub-arrays connected to the receiver is at least three, and all signals from all antenna sub-arrays are evaluated during the scheduled gap.

9. The controller of claim 7, wherein the quality comprises signal strength.

10. The controller of claim 7, wherein, to evaluate the quality of additional signals, the controller is further configured to:

activate a switching network to disconnect from at least one of the first and second antenna sub-arrays; and activate the switching network to connect to at least one of the additional antenna sub-arrays.

* * * * *